(12) United States Patent
Chen

(10) Patent No.: US 7,957,308 B2
(45) Date of Patent: *Jun. 7, 2011

(54) SELECTABLE TRAINING SIGNALS BASED ON STORED PREVIOUS CONNECTION INFORMATION FOR DMT-BASED SYSTEM

(75) Inventor: Yuanjie Chen, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 657 days.

This patent is subject to a terminal disclaimer.

(21) Appl. No.: 11/714,247

(22) Filed: Mar. 6, 2007

(65) Prior Publication Data

US 2007/0171940 A1    Jul. 26, 2007

Related U.S. Application Data

(63) Continuation of application No. 11/132,147, filed on May 18, 2005, now Pat. No. 7,187,696, which is a continuation of application No. 09/863,522, filed on May 23, 2001, now Pat. No. 6,922,397.

(60) Provisional application No. 60/261,742, filed on Jan. 16, 2001.

(51) Int. Cl.
*G01R 31/08* (2006.01)

(52) U.S. Cl. .................. 370/252; 370/484; 370/465

(58) Field of Classification Search .................. None
See application file for complete search history.

(56) References Cited

U.S. PATENT DOCUMENTS

| | | |
|---|---|---|
| 5,533,008 A | 7/1996 | Grube et al. |
| 5,557,612 A | 9/1996 | Bingham |
| 5,999,540 A | 12/1999 | McGhee |
| 6,324,268 B1 | 11/2001 | Balachandran et al. |
| 6,345,071 B1 | 2/2002 | Hamdi |
| 6,408,033 B1 | 6/2002 | Chow et al. |
| 6,516,027 B1 | 2/2003 | Kapoor et al. |
| 6,587,502 B1 | 7/2003 | Hendrichs et al. |

(Continued)

FOREIGN PATENT DOCUMENTS

WO    WO 99/20027    4/1999

(Continued)

OTHER PUBLICATIONS

Bingham, "ADSL, VDSL, and Multicarrier Modulation", John Wiley & Sons Inc. 2000, 303 pages.

(Continued)

*Primary Examiner* — Duc C Ho
(74) *Attorney, Agent, or Firm* — Sterne, Kessler, Goldstein & Fox P.L.L.C.

(57) ABSTRACT

In a DMT based system, training signals can be chosen based on stored prior connection information to reduce using extra tones in transmitted training signals to improve receiver performance. By choosing training signals based on the stored prior connection information, training signals may be made to indirectly represent a function of the loop impairments. Certain training signal tones in the training signals may be omitted, based on previous connection information, on a loop-by-loop basis. Local echoes are effectively reduced and local receiver training is improved without affecting eventual data transmission performance. Higher AGC gain and higher signal-to-quantization-noise ratios can be achieved, especially in the case of long loops. These benefits can allow (1) improvements in the loop performance in the receiving direction and/or (2) reductions in the requirements on the receiving ADC. Crosstalks into other wire pairs of a bundle, are reduced, improving the transmission environment on those pairs.

16 Claims, 2 Drawing Sheets

U.S. PATENT DOCUMENTS

| | | | |
|---|---|---|---|
| 6,611,564 B1 | 8/2003 | Linz et al. | |
| 6,628,704 B1 | 9/2003 | Long et al. | |
| 6,674,795 B1 * | 1/2004 | Liu et al. .................. | 375/231 |
| 6,718,019 B1 | 4/2004 | Heidari et al. | |
| 6,804,267 B1 * | 10/2004 | Long et al. ................ | 370/524 |
| 6,922,397 B1 * | 7/2005 | Chen ........................ | 370/252 |
| 7,187,696 B2 * | 3/2007 | Chen ........................ | 370/484 |
| 2001/0048667 A1 * | 12/2001 | Hamdi ....................... | 370/252 |
| 2002/0041643 A1 | 4/2002 | Tzannes et al. | |
| 2003/0026282 A1 | 2/2003 | Gross et al. | |
| 2005/0129103 A1 | 6/2005 | Palm | |

FOREIGN PATENT DOCUMENTS

| | | |
|---|---|---|
| WO | WO 99/48304 | 9/1999 |
| WO | WO 01/95580 | 12/2001 |

OTHER PUBLICATIONS

Cioffi et al., "A Data Driven Multitone Echo Cnaceller", IEEE Transactions on Communications, vol. 42, No. 10, Oct. 1994, pp. 2853-2869.

ITU-T Recommendation G.992.1, Asymmetric Digital Subscriber Line (ADSL) Transceivers, 1999, pp. 256.

ITU-T Recommendation G-992.2, Splitterless Asymmetric Digital Subscriber Line (ADSL) Transceivers, 1999, pp. 1-170.

3Com® Base Level ADSL Interoperability Specification, Discrete Multi-Tone (DMT), Lucent Technologies, Bell Labs Innovations, Revision 1.0.43, updated May 22, 1998, 16 pp.

* cited by examiner

SELECTABLE TRAINING SIGNALS BASED ON STORED PREVIOUS CONNECTION INFORMATION FOR DMT-BASED SYSTEM

CROSS-REFERENCE TO RELATED APPLICATION(S)

This application is a continuation of U.S. application Ser. No. 09/863,522, filed May 23, 2001, which claims the benefit of U.S. Provisional Application No. 60/261,742, filed Jan. 16, 2001.

FIELD OF THE INVENTION

The invention relates to data communications and, in particular, to multitone modulation such as employed digital subscriber line (DSL) communications.

DESCRIPTION OF THE RELATED ART

A digital subscriber line (DSL) system uses the existing twisted-pair telephone wires to carry data between central offices (CO) and customer premise equipment (CPE). Data transmissions from CO to CPE (downstream direction) and from CPE to CO (upstream direction) usually occupy different bands (or sub-channels), although in some echo cancelled implementations, both upstream and downstream transmissions may occupy the same band. One of the modulation techniques used in a DSL system is called discrete multitone modulation (DMT). DMT techniques partition the transmission channel in each direction into a bank of orthogonal, memoryless sub-channels, and transmit data through each sub-channel independently.

In general, a DMT-based DSL connection is established by training receivers, probing channels, and allocating varying number of bits to sub-channels for data transmission. Initially, signals are sent in both directions to train the receivers and to probe the channels. Then, a signal-to-interference-plus-noise ratio (SINR) is calculated on each sub-channel, and bits are allocated to each sub-channel based on its SINR. In this context, interference may include echoes, crosstalk, radio frequency interference (RFI), etc. To accommodate a wide range of loops and interference, training signals usually include a range of tones (possibly all the available tones) within the respective bands. The tones that are actually used for data transmission are determined based on channel probing results and bit-loading algorithms.

Training signals have typically been selected independent of loop impairments. Accordingly, there are often tones in the training signals that are not used in the final data transmission. Potentially, many tones are included in the training signals but not employed in data transmissions over a given sub-channel. These extra tones in the training signals do not contribute to actual data transmission performance. However, they may degrade performance in the receiving direction by creating unnecessarily high echoes. In the case of long subscriber loops, communication equipment may be particularly sensitive to such degradation. In addition, they may degrade performance in the other wire pairs by creating unnecessarily high crosstalks into those wire pairs.

SUMMARY OF THE INVENTION

It has been discovered that training signals can be chosen based on stored prior connection information so as to reduce the use of extra tones in transmitted training signals and thereby improve receiver performance. By choosing training signals based on the stored prior connection information, it is possible to make the training signals indirectly a function of the loop impairments. One advantage of this scheme is that we can choose to omit certain tones in the training signals, based on previous connection information, on a loop-by-loop basis. For example, in an ADSL Transceiver Unit-Central office end (ATU-C) device, per-local-loop prior connection information may be employed to select DMT tones to be included in downstream training signals. Similarly, in an ADSL Transceiver Unit-Remote terminal end (ATU-R) device, prior connection information may be employed to select DMT tones to be included in upstream training signals. In each case, local echoes are effectively reduced and local receiver training is improved without affecting eventual data transmission performance in the other direction. As a result, higher AGC gain and higher signal-to-quantization-noise ratios can be achieved, especially in the case of long loops. These benefits can allow (1) improvements in the loop performance in the receiving direction and/or (2) reductions in the requirements on the receiving ADC. In addition, crosstalks into the other wire pairs, especially those in the same bundle, are also reduced, improving the transmission environment on those pairs.

In some realizations in accordance with the present invention, prior connection information (including bit allocation and training signals used) is stored at the transmitting side and training signals are selected based on the stored previous connection information. In this way, the set of tones employed in training signals for a given sub-channel is indirectly a function of loop impairments. Accordingly, tones unlikely to be used in data transmission for a particular loop will generally not be included in the training signals. While stored connection information may vary from implementation to implementation, some realizations store largest and smallest tone indices employed in various sub-channels during a most recent connection. Other realizations may store other information such as amplitude and/or phase information for the tones employed. If desirable, a history of prior connection information may be maintained and employed in training tone selection.

In one embodiment in accordance with the present invention, a method of enhancing performance of a receiver includes selecting a training subset of less than all signal elements based on those signal elements employed in one or more recent data transmissions and transmitting, during a training interval, substantially only the signal elements of the training subset. The method can be employed in a communications configuration wherein a device receives a signal over a communication channel while simultaneously transmitting a training signal thereover. In some variations, the method further includes storing a encoding of employed signal elements for use in subsequent training subset selections. In some variations, the training subset selection is performed as a function of plural sets of prior connection information. In some variations, the training subset selection is performed using a design function to accommodate changing impairments of the communications channel.

In another embodiment in accordance with the present invention, a method of reducing crosstalk into a communication channel includes selecting a training subset of less than all signal elements based on those of the signal elements employed in one or more recent data transmissions and transmitting, during a training interval, substantially only the signal elements of the training subset. In some realizations, the crosstalk reduction is between wire pairs.

In another embodiment in accordance with the present invention, a method of improving receiver performance includes substantially limiting, based on prior connection information, a subset of tones transmitted as part of a training signal to those tones likely to be employed for same direction data transmission. The method may be employed in a bi-directional communications configuration wherein opposing direction training signals are simultaneously transmitted via a bi-directional communications channel. In some variations, the method includes storing an encoding of employed tones for use in a subsequent performance of the tone subset limiting.

In still another embodiment in accordance with the present invention, a method of operating a digital subscriber line transceiver unit includes selecting, based on stored prior connection information, a subset of less than all available tones for inclusion in a training signal, and transmitting the training signal via a digital subscriber loop. The training signal consists essentially of the subset of tones, such that simultaneous reception by the transceiver unit during the portion of the training interval is substantially unaffected by local echo contributions of tones unlikely to be employed during data transmission. In some variations, the subset selection is performed based on tone sets employed and bit allocation results for at least one prior connection via the digital subscriber loop.

In still yet another embodiment in accordance with the present invention, a communications device includes a transceiver unit and a training signal generator. The transceiver unit is adapted for simultaneously receiving a signal and transmitting a training signal via a communications channel. The training signal generator is coupled to the transceiver unit and is selective for a subset of less than all signal elements for inclusion in the training signal based on stored prior connection information. In some variations, the communications device is embodied as a digital subscriber line transceiver.

In still yet another embodiment in accordance with the present invention, digital subscriber line transceiver unit includes a prior connection information store and a training signal generator. The training signal generator is selective for a subset of less than all available tones for inclusion in a training signal based on information stored in the prior connection information store. When transmitted by the digital subscriber line transceiver unit, the training signal consists essentially of the subset of tones, such that simultaneous reception by the digital subscriber line transceiver unit is substantially unaffected by local echo contributions of tones unlikely to be employed during data transmission. Alternatively, or additionally, in some realizations, a second communication channel is substantially unaffected by crosstalk from tones unlikely to be employed during data transmission.

In still yet another embodiment in accordance with the present invention, a computer program product is encoded in at least one computer readable medium and includes a first functional sequence executable to select a subset of less than all available tones for inclusion in a training signal. The selection is based on stored prior connection information. When transmitted by a transceiver unit via a communication channel, the training signal consists essentially of the subset of tones, such that simultaneous reception by the transceiver unit during a training interval is substantially unaffected by local echo contributions of tones unlikely to be employed during data transmission.

In still yet another embodiment in accordance with the present invention, an apparatus includes a transceiver and means for selecting, based on prior connection information, a subset of signal elements for inclusion in a training transmission.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE INVENTION

In a discrete multitone modulation system, local echoes generated from transmission in one direction can be a major impairment for receive performance in the other direction, especially in the cases of long loops. At the receiving end, the local echoes are usually much larger than the received signal from the other end. As a result, the gain of automatic gain control (AGC) is set mainly by local echoes, which puts more stringent requirements on the receiving ADC in the case of long loops. Although training signals can include all the tones or a fixed range of tones in the band, some of those tones will typically not be used for data transmission. As a result, use of a full set of tones in the training signal can result in unnecessarily high local echoes and performance degradation in the receiving direction. Accordingly, the techniques described herein allow the set of tones in a training signal to be reduced in correspondence with tones actually employed in one or more recent data transmissions.

These techniques are generally applicable to a variety of data communications systems. Nonetheless, certain aspects of the present invention will be understood in the context of systems, signaling standards and terminology typical of Asymmetric Digital Subscriber Line (ADSL) telecommunications technology. Although a variety of designs are suitable, transceivers conforming to certain international standards are illustrative. In particular, ITU-T Recommendations G.992.1 and G992.2 define a framework of transmission systems and transceiver signaling standards in which techniques of the present invention will be understood by persons of ordinary skill in the art. See generally, ITU-T Recommendation G.992.1, *Asymmetric Digital Subscriber Line (ADSL) Transceivers* (1999) (hereinafter referred to as "Recommendation G.992.1") and ITU-T Recommendation G.992.2, *Splitterless Asymmetric Digital Subscriber Line (ADSL) Transceivers* (1999) (hereinafter referred to as "Recommendation G.992.2"), the entirety of which are incorporated by reference herein. While devices, systems and methods in accordance with the above incorporated standards are illustrative, based on the description herein, persons of ordinary skill in the art will understand a wide variety of suitable implementations.

Figure 1:
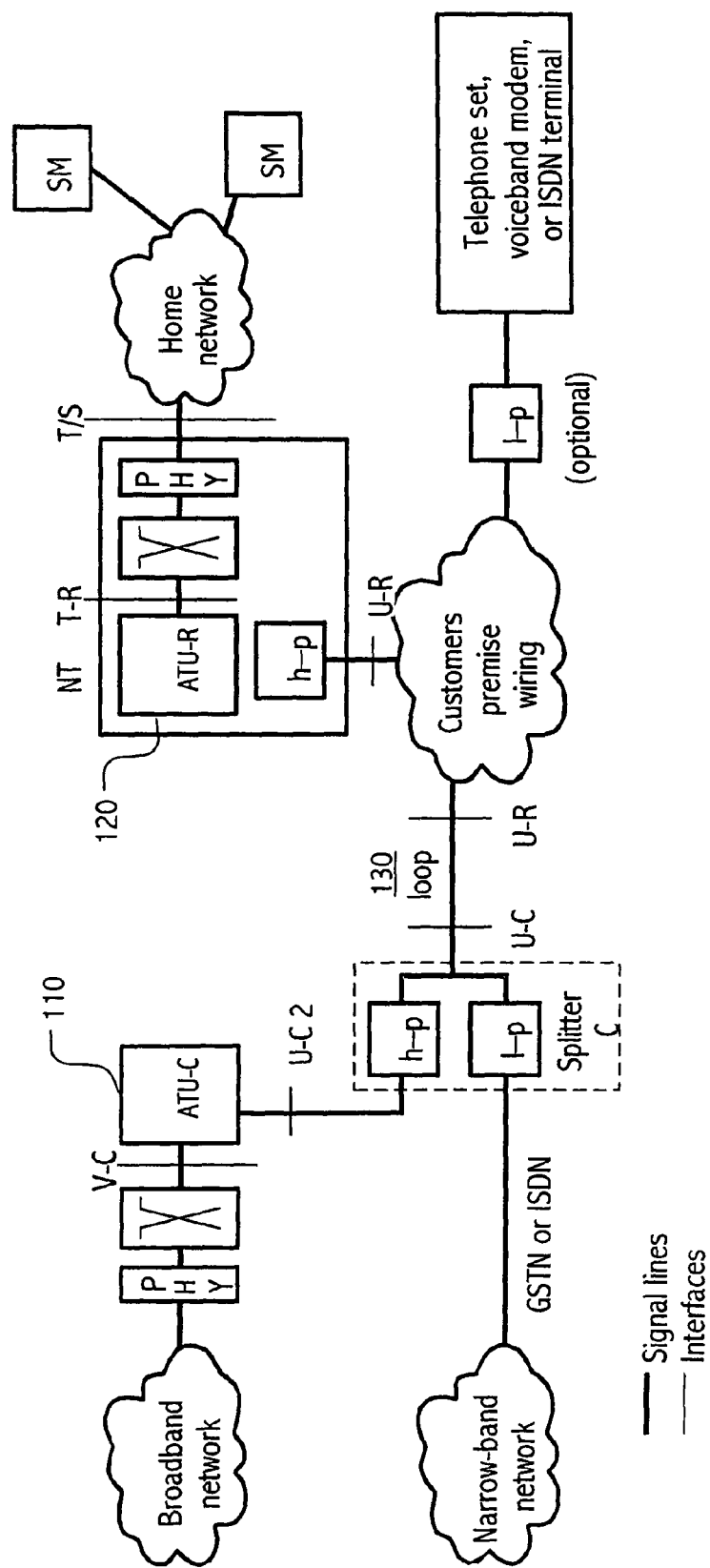
FIG. 1 depicts an illustrative configuration typical of Asymmetric Digital Subscriber Line (ADSL) communications between a central office (CO) and customer premise equipment (CPE).

FIG. 1 illustrates a reference model for an ADSL communication system typical of Recommendation G.992.2. In particular, a communication path between an ADSL Transceiver Unit-Central office end (ATU-C) device 110 and an ADSL Transceiver Unit-Remote terminal end (ATU-R) device 120 includes a local loop 130. Various splitter and splitterless configurations are possible, although FIG. 1 illustrates a splitterless configuration in accordance with Recommendation G.992.2. Communication between ATU-C device 110 and ATU-R device 120 exploits a number of subchannels (typically 4.3 125 KHz bands) in the spectrum from 0 Hz to about 1.1 MHz. Typically, the low frequency end of the spectrum, i.e., the voice band from 0-4 KHz, is reserved for plain old telephone services (POTS) signaling. To prevent leakage from ADSL frequencies to the voice band, subchannels 2-6 are often reserved to preserve a guard band between the voice band (subchannel 1) and the first active ADSL subchannel.

In an exemplary implementation, downstream data transmission (e.g., from ATU-C device 110 to ATU-R device 120) is possible via subchannels between 26 KHz and 1.1 MHz while upstream data transmission (e.g., from ATU-R device 120 to ATU-C device 110) is possible via subchannels between 26 KHz and 138 KHz. While each subchannel is theoretically capable of carrying data, only those subchannels with sufficient signal-to-interference-plus-noise ratio (SINR) are allocated to data traffic. Depending on subchannel characteristics, different bit counts and transmit powers may be employed in various subchannels. In some implementations, duplex data transmission is employed on some sub-channels. Techniques for line probing and receiver training using DMT coding technology are well understood in the art and specific protocols employed by ADSL transceiver units are described in detail in the above-incorporated Recommendations G.992.1 and G.992.2.

Figure 2:
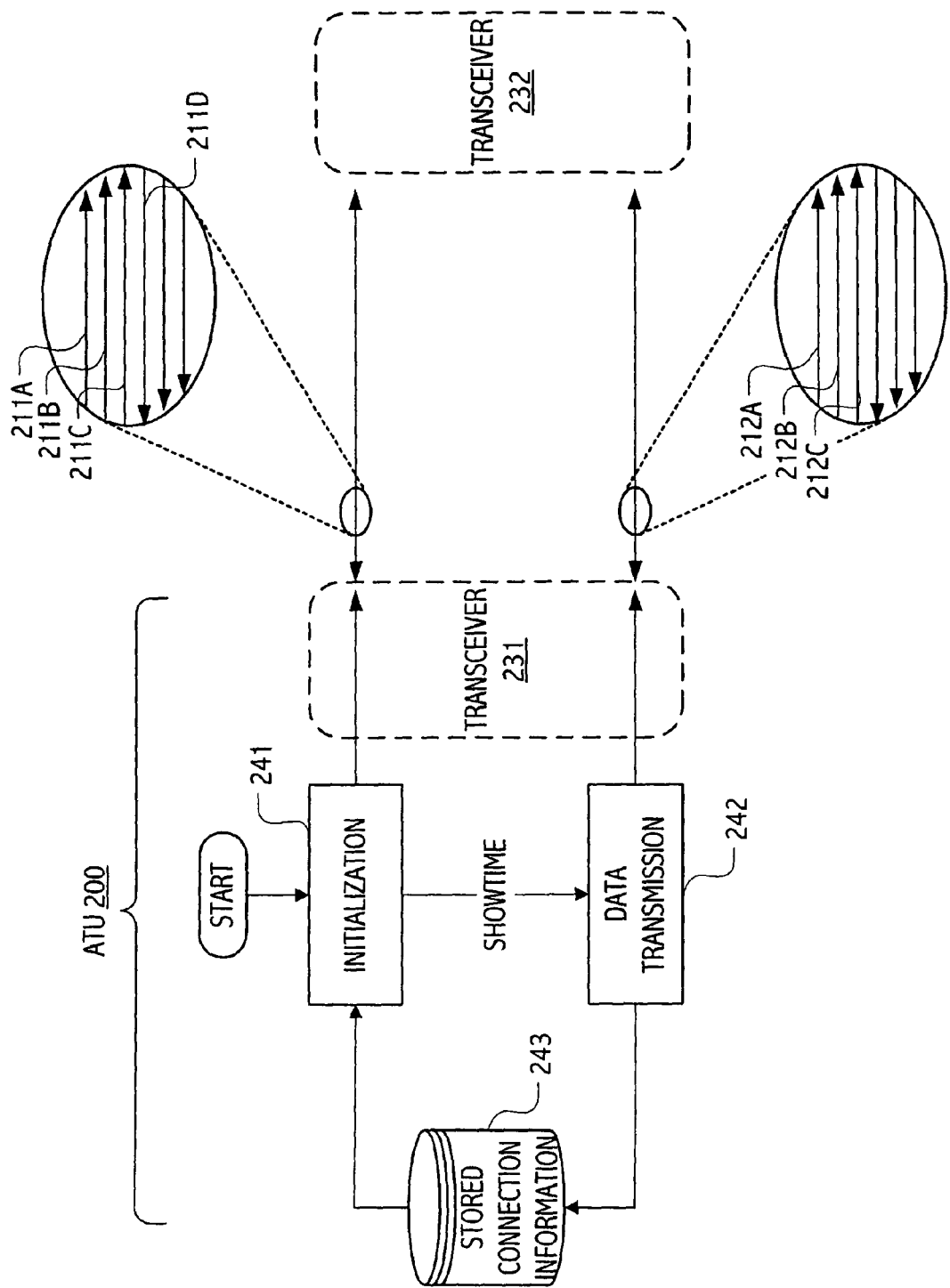
FIG. 2 depicts use of stored connection information in the selection of DMT tones during initialization of a connection between transceivers.

Building on existing DMT technology, an improved technique has been developed and is now described with reference to FIG. 2. Rather than employing each of the tones available in a given subchannel during initialization, an ATU (e.g., an ATU-C or ATU-R device) retrieves stored information (243) regarding those tones previously employed in data transmission after line probing and receiver training. In this way, the set of tones employed by transceiver 231 during initialization (241) to support receiver training at transceiver 232 is a function of those tones previously employed for data transmission (242). Focusing on the illustration of FIG. 2, information descriptive of the DMT tones employed during previous data transmission (e.g., over subchannels 212A, 212B and 212C) is later used to select tones employed during initialization procedures on respective subchannels (e.g., 211A, 211B and 211C). In this way, the quality of training signals received (e.g., via subchannel 211D) is not reduced by local echo of tones transmitted by transceiver 231 during initialization (e.g., on subchannel 211A, 211B or 211C), which are unlikely to actually be used during data transmission.

In one realization, ATU 200 stores the previous connection information at the transmitting side and chooses the training signals or some parameters of the training signals in the subsequent training based on the stored previous connection information. Any of a variety of storage media may be employed. A wide variety of previous connection information encodings and algorithmic exploitations are envisioned and will be appreciated by persons of ordinary skill in the art based on the examples that follow.

If we denote the stored prior connection information as $\{K_n: n=1, 2, \ldots\}$, and assume that the training signals include a set of tones at some specified frequencies with magnitude $A_i$ and phase $\emptyset_i$, a general expression of a selection relation between prior connection information and initialization tones is as follows:

$$[A_i \emptyset_i] = f_i(\{K_n: n=1,2,\ldots\}) \tag{1}$$

where $K_n$ is the connection information for each of n prior connections. In other words, the amplitude and phase of each tone are functions of the stored previous connection information. In some implementations, $K_n$ encodes both the training signals (or tones) used and bit allocation results. Equation (1) specifies a general technique for choosing training signals for a particular subchannel based on the stored previous connection information.

More specifically, the general technique can be applied to discrete multitone modulation (DMT) systems in which training signals are defined in terms of a contiguous range of tones with constant amplitudes. In this case, parameters of the training signals can be represented as a starting tone index $I_s$ and ending tone index $I_e$ and related to stored previous connection information $K_n$. For example, if $I_{n,min}^{(t)}, I_{n,max}^{(t)}$ are respectively the smallest and the largest tone index used in the training signals, and $I_{n,min}^{(d)}, I_{n,max}^{(d)}$ are respectively the smallest and the largest tone index used in actual data transmission, then a variety of suitable functions may be defined that relate starting and ending tone indices $I_s$ and $I_e$ to previous connection information.

The following equations illustrate several ways of selecting training parameters and hence tones for use during initialization:

$$I_s = \min_n (I_{n,min}^{(d)}) + g_s(I_{n,min}^{(d)} - I_{n,min}^{(t)}) - C_s \tag{2}$$
$$I_e = \max_n (I_{n,max}^{(d)}) + g_e(I_{n,max}^{(d)} - I_{n,max}^{(t)}) + C_e$$

$$I_s = \text{median}_n(I_{n,min}^{(d)}) + g_s(I_{n,min}^{(d)} - I_{n,min}^{(t)}) - C_s \tag{3}$$
$$I_e = \text{median}_n(I_{n,max}^{(d)}) + g_e(I_{n,max}^{(d)} - I_{n,max}^{(t)}) + C_e$$

$$I_s = \max_n (I_{n,min}^{(d)}) + g_s(I_{n,min}^{(d)} - I_{n,min}^{(t)}) - C_s \tag{4}$$
$$I_e = \min_n (I_{n,max}^{(d)}) + g_e(I_{n,max}^{(d)} - I_{n,max}^{(t)}) + C_e$$

where $g_s()$ and $g_e()$ are some design functions and $C_s$ and $C_e$ are design parameters, which may be defined to accommodate changing loop impairments over time. Use of min, max and median functions are merely illustrative and persons of ordinary skill in the art will appreciate suitable design functions and parameters for expected variations in loop impairments.

While the preceding description has illustrated selection of training signals based on stored previous connection information, persons of ordinary skill in the art will appreciate that such selections need not be applied to all stages of an initialization protocol. Indeed, selection of training signals or tones may be deferred until after a particular stage of initialization. In such case, certain receiver parameters may need to be updated coincident with training signal selection. For example, in an implementation where an initial phase of training is performed using a more complete set of DMT tones and a reduced set (based on stored previous connection information and selection techniques such as described herein) is employed during later phases, parameters such as AGC gain should be adjusted and a bit-loading algorithm should be run, in order to utilize the full advantages of tone selection.

In general, techniques described herein support improved selection of training signals based on stored prior connection information. In some realizations, particular DMT tones are selected for use in a given sub-channel by a DSL transceiver based on DMT tones employed for data transmission during one or more prior connections. Communication systems methods, devices (including ADSL transceiver units) and articles of manufacture (including computer program products) are all envisioned and will be appreciated by persons of ordinary skill in the art based on the description herein. In some realizations, initialization and data communication are in accordance with ITU-T Recommendations G.992.1 or G.992.2. However, based on the description herein, persons of ordinary skill in the art will appreciate a variety of applications of the underlying techniques, including applications based on other communications standards, future communications standards or no particular agreed standard.

While the invention has been described with reference to various embodiments, it will be understood that these embodiments are illustrative and that the scope of the invention is not limited to them. Many variations, modifications, additions, and improvements are possible. Plural instances may be provided for components, operations or structures described herein as a single instance. Boundaries between various components, operations and data stores are somewhat arbitrary, and particular functions and operations are illustrated in the context of specific illustrative configurations. Other allocations of functionality are envisioned and may fall within the scope of claims that follow. Structures and functionality presented as discrete components in the exemplary configurations may be implemented as a combined structure or component. These and other variations, modifications, additions, and improvements may fall within the scope of the invention as defined in the claims that follow.

What is claimed is:

1. A method for training a communications device, comprising:
    (a) transmitting, by a second communications device, a first set of signal elements over a first connection;
    (b) storing connection information relating to the first connection by the second communications device to produce stored connection information;
    (c) producing a second set of signal elements by the second communications device based on the stored connection information, wherein the second set of signal elements includes fewer signal elements than the first set of signal elements; and
    (d) transmitting, by the second communications device, the second set of signal elements over a second connection to the communications device.

2. The method of claim 1, wherein step (c) comprises:
    (c)(i) determining, based on the stored connection information, unused one or more signal elements in the first set of signal elements; and
    (c)(ii) omitting the unused one or more signal elements from the second set of signal elements.

3. The method of claim 1, wherein step (b) comprises:
    (b)(i) storing amplitude information or phase information corresponding to signal elements used in the first connection.

4. The method of claim 3, wherein step (c) comprises:
    (c)(i) producing a set of tones for the second set of signal elements, each of the tones having an amplitude and a phase, wherein the amplitude and the phase of each of the tones are functions of the stored connection information.

5. The method of claim 1, wherein step (b) comprises:
    (b)(i) storing the connection information including a smallest and a largest tone index corresponding to tones employed in the first connection according to a discrete multi-tone (DMT) modulation system.

6. The method of claim 5, wherein step (c) comprises:
    (c)(i) producing the second set of signal elements having DMT tones and starting and ending tone indices corresponding to the DMT tones of the second set of signal elements, wherein the DMT tones, and the starting and ending tone indices are functions of the stored connection information.

7. The method of claim 1, wherein step (d) comprises:
    (d)(i) transmitting the second set of signal elements over the second connection during a receiver training session.

8. The method of claim 1, wherein the first set of signal elements were previously employed in data transmission.

9. An apparatus for training a communications device, comprising:
    a transmitter configured to transmit a first set of signal elements over a first connection;
    a data store, coupled to the transmitter, configured to store connection information relating to the first connection; and
    a training signal generator, coupled to the data store, configured to produce a second set of signal elements based on the stored connection information, wherein the second set of signal elements includes fewer signal elements than the first set of signal elements, wherein
    the transmitter is further configured to transmit the second set of signal elements over a second connection.

10. The apparatus of claim 9, wherein the training signal generator is configured to determine, based on the stored connection information, unused one or more signal elements in the first set of signal elements and to omit the unused one or more signal elements from the second set of signal elements.

11. The apparatus of claim 9, wherein the data store is configured to store amplitude information or phase information corresponding to signal elements used in the first connection.

12. The apparatus of claim 11, wherein the training signal generator is configured to produce a set of tones for the second set of signal elements, each of the tones having an amplitude and a phase, wherein the amplitude and the phase of each of the tones are functions of the stored connection information.

13. The apparatus of claim 9, wherein the data store is configured to store the connection information including a smallest and a largest tone index corresponding to tones employed in the first connection according to a discrete multi-tone (DMT) modulation system.

14. The apparatus of claim 13, wherein the training signal generator is configured to produce the second set of signal elements having DMT tones and starting and ending tone indices corresponding to the DMT tones of the second set of signal elements, wherein the DMT tones and the starting and ending tone indices are functions of the stored connection information.

15. The apparatus of claim 9, wherein the transmitter is configured to transmit the second set of signal elements over the second connection during a receiver training session.

16. The apparatus of claim 9, wherein the first set of signal elements were previously employed in data transmission.

* * * * *